US008397269B2

(12) United States Patent
Barrett et al.

(10) Patent No.: US 8,397,269 B2
(45) Date of Patent: Mar. 12, 2013

(54) FAST DIGITAL CHANNEL CHANGING

(75) Inventors: Peter T. Barrett, San Francisco, CA (US); James A. Baldwin, Redwood City, CA (US)

(73) Assignee: Microsoft Corporation, Redmond, WA (US)

(*) Notice: Subject to any disclaimer, the term of this patent is extended or adjusted under 35 U.S.C. 154(b) by 1433 days.

(21) Appl. No.: 10/218,674

(22) Filed: Aug. 13, 2002

(65) Prior Publication Data

US 2004/0034863 A1    Feb. 19, 2004

(51) Int. Cl.
*H04N 7/173* (2011.01)
(52) U.S. Cl. .................. 725/120; 725/114; 725/115
(58) Field of Classification Search .......... 725/38, 725/93–95, 114–117, 120, 86; 348/731
See application file for complete search history.

(56) References Cited

U.S. PATENT DOCUMENTS

| | | | |
|---|---|---|---|
| 5,461,415 A | 10/1995 | Wolf et al. | |
| 5,473,362 A | 12/1995 | Fitzgerald et al. | |
| 5,583,868 A | 12/1996 | Rashid et al. | |
| 5,631,694 A | 5/1997 | Aggarwal et al. | |
| 5,699,362 A | 12/1997 | Makam | |
| 5,724,646 A | 3/1998 | Ganek et al. | |
| 5,724,648 A | 3/1998 | Shaughnessy et al. | |
| 5,732,217 A | 3/1998 | Emura | |
| 5,822,537 A | 10/1998 | Katseff et al. | |
| 5,884,141 A | 3/1999 | Inoue et al. | |
| 5,892,915 A | 4/1999 | Duso et al. | |
| 5,926,230 A | 7/1999 | Niijima et al. | |
| 5,926,659 A | 7/1999 | Matsui | |
| 5,936,659 A | 8/1999 | Viswanathan et al. | |
| 5,963,202 A * | 10/1999 | Polish ......................... 715/723 | |
| 6,047,317 A | 4/2000 | Bisdikian et al. | |
| 6,078,594 A | 6/2000 | Anderson et al. | |
| 6,118,498 A | 9/2000 | Reitmeier | |
| 6,138,147 A | 10/2000 | Weaver et al. | |
| 6,222,482 B1 | 4/2001 | Gueziec | |
| 6,222,886 B1 | 4/2001 | Yogeshwar | |

(Continued)

FOREIGN PATENT DOCUMENTS

| | | | |
|---|---|---|---|
| CA | 2480461 | | 10/2003 |
| EP | 0633694 | * | 1/1995 |

(Continued)

OTHER PUBLICATIONS

U.S. Appl. No. 10/798,993; Barrett, et al.; Filed Mar. 12, 2004.

(Continued)

*Primary Examiner* — John Shnurr
(74) *Attorney, Agent, or Firm* — Wolfe-SBMC

(57) ABSTRACT

Fast channel changing in digital-television-based entertainment networks can be implemented, for example, by electing to tune to channels at opportune tuning times. In an exemplary implementation, a method includes: receiving a channel change request that indicates a requested new channel from a client device; preparing a broadcast video data stream of the requested new channel that is offset in time behind a current broadcast time for broadcast video data of the requested new channel; and streaming the broadcast video data stream responsive to the channel change request. In another exemplary implementation, a system includes: a storage device that retains broadcast video data for multiple channels; a video data extractor that accesses the retained broadcast video data and retrieves an intra frame of broadcast video data that is in the past for a requested channel; and a video data distributor that transmits the retrieved intra frame of broadcast video data.

45 Claims, 6 Drawing Sheets

U.S. PATENT DOCUMENTS

| | | | |
|---|---|---|---|
| 6,266,817 B1 | 7/2001 | Chaddha | |
| 6,330,286 B1 | 12/2001 | Lyons et al. | |
| 6,418,473 B1 | 7/2002 | St. Maurice et al. | |
| 6,430,547 B1 | 8/2002 | Busche et al. | |
| 6,496,814 B1 | 12/2002 | Busche | |
| 6,505,106 B1 | 1/2003 | Lawrence et al. | |
| 6,564,262 B1 | 5/2003 | Chaddha | |
| 6,580,754 B1 | 6/2003 | Wan et al. | |
| 6,609,149 B1 | 8/2003 | Bandera et al. | |
| 6,615,133 B2 | 9/2003 | Boies et al. | |
| 6,637,031 B1 | 10/2003 | Chou | |
| 6,721,952 B1 | 4/2004 | Guedalia et al. | |
| 6,728,965 B1 | 4/2004 | Mao | |
| 6,738,980 B2 | 5/2004 | Lin et al. | |
| 6,751,129 B1 | 6/2004 | Gongwer | |
| 6,751,626 B2 | 6/2004 | Brown et al. | |
| 6,766,245 B2 | 7/2004 | Padmanabhan | |
| 6,837,031 B1 | 1/2005 | Hannen et al. | |
| 6,842,724 B1 | 1/2005 | Lou et al. | |
| 6,856,759 B1 | 2/2005 | Fukuda et al. | |
| 6,898,246 B2 | 5/2005 | Kayayama | |
| 6,985,188 B1* | 1/2006 | Hurst, Jr. | 348/553 |
| 6,986,156 B1* | 1/2006 | Rodriguez et al. | 725/95 |
| 7,010,801 B1* | 3/2006 | Jerding et al. | 725/95 |
| 7,051,170 B2 | 5/2006 | Guo | |
| 7,106,749 B1 | 9/2006 | Darshan et al. | |
| 7,158,531 B2 | 1/2007 | Barton | |
| 7,167,488 B2 | 1/2007 | Taylor et al. | |
| 7,219,145 B2 | 5/2007 | Chmaytelli et al. | |
| 7,334,044 B1 | 2/2008 | Allen | |
| 7,382,796 B2 | 6/2008 | Haberman et al. | |
| 7,409,456 B2* | 8/2008 | Sitaraman | 709/231 |
| 7,430,222 B2 | 9/2008 | Green et al. | |
| 7,443,791 B2 | 10/2008 | Barrett et al. | |
| 7,562,375 B2 | 7/2009 | Barrett et al. | |
| 7,603,689 B2 | 10/2009 | Baldwin et al. | |
| 8,156,534 B2 | 4/2012 | Barrett et al. | |
| 2002/0002708 A1 | 1/2002 | Arye | |
| 2002/0024956 A1 | 2/2002 | Keller-Tuberg | |
| 2002/0031144 A1 | 3/2002 | Barton | |
| 2002/0040481 A1 | 4/2002 | Okada et al. | |
| 2002/0107968 A1 | 8/2002 | Horn et al. | |
| 2002/0108119 A1 | 8/2002 | Mao et al. | |
| 2002/0114331 A1 | 8/2002 | Cheung et al. | |
| 2002/0124258 A1 | 9/2002 | Fritsch | |
| 2002/0144276 A1 | 10/2002 | Radford et al. | |
| 2002/0147979 A1 | 10/2002 | Corson | |
| 2002/0147991 A1 | 10/2002 | Furlan et al. | |
| 2002/0170067 A1 | 11/2002 | Norstrom et al. | |
| 2003/0037331 A1 | 2/2003 | Lee | |
| 2003/0060196 A1 | 3/2003 | Levinberg | |
| 2003/0093801 A1* | 5/2003 | Lin et al. | 725/90 |
| 2003/0106053 A1 | 6/2003 | Sih et al. | |
| 2003/0158899 A1* | 8/2003 | Hughes | 709/205 |
| 2003/0159143 A1 | 8/2003 | Chan | |
| 2003/0202594 A1 | 10/2003 | Lainema | |
| 2003/0202775 A1 | 10/2003 | Junkersfeld et al. | |
| 2003/0223430 A1* | 12/2003 | Lodha et al. | 370/395.41 |
| 2004/0003399 A1 | 1/2004 | Cooper | |
| 2004/0034863 A1 | 2/2004 | Barrett et al. | |
| 2004/0034864 A1 | 2/2004 | Barrett et al. | |
| 2004/0049793 A1 | 3/2004 | Chou | |
| 2004/0071216 A1* | 4/2004 | Richardson et al. | 375/240.21 |
| 2004/0128694 A1 | 7/2004 | Bantz et al. | |
| 2004/0160971 A1 | 8/2004 | Krause et al. | |
| 2004/0160974 A1 | 8/2004 | Read et al. | |
| 2004/0255328 A1 | 12/2004 | Baldwin et al. | |
| 2005/0039214 A1 | 2/2005 | Lorenz et al. | |
| 2005/0071496 A1 | 3/2005 | Singal et al. | |
| 2005/0078680 A1 | 4/2005 | Barrett et al. | |
| 2005/0078757 A1 | 4/2005 | Nohrden | |
| 2005/0080904 A1 | 4/2005 | Green | |
| 2005/0081243 A1 | 4/2005 | Barrett et al. | |
| 2005/0081244 A1 | 4/2005 | Barrett et al. | |
| 2005/0081246 A1 | 4/2005 | Barrett et al. | |
| 2005/0128951 A1 | 6/2005 | Chawla et al. | |
| 2005/0154917 A1 | 7/2005 | deCarmo | |
| 2005/0172314 A1 | 8/2005 | Krakora et al. | |
| 2005/0190781 A1 | 9/2005 | Green et al. | |
| 2005/0240961 A1 | 10/2005 | Jerding et al. | |
| 2006/0117343 A1* | 6/2006 | Novak et al. | 725/38 |
| 2006/0117358 A1 | 6/2006 | Baldwin et al. | |
| 2006/0117359 A1 | 6/2006 | Baldwin et al. | |
| 2006/0126667 A1 | 6/2006 | Smith et al. | |
| 2006/0251082 A1 | 11/2006 | Grossman et al. | |
| 2007/0113261 A1 | 5/2007 | Roman et al. | |
| 2009/0161769 A1 | 6/2009 | Barrett et al. | |

FOREIGN PATENT DOCUMENTS

| | | |
|---|---|---|
| EP | 0633694 A1 | 1/1995 |
| EP | 1294193 | 9/2002 |
| JP | 2001204035 | 7/2001 |
| JP | 2001516184 | 9/2001 |
| TW | 388182 | 4/2000 |
| WO | WO9806045 | 2/1998 |
| WO | WO 99/09741 | 2/1999 |
| WO | WO9909741 * | 2/1999 |
| WO | WO-0009741 | 2/2000 |
| WO | WO0103373 | 1/2001 |
| WO | WO0126271 | 4/2001 |
| WO | WO 01/56285 | 8/2001 |
| WO | WO02087235 | 10/2002 |
| WO | WO03088646 | 10/2003 |
| WO | WO2004062291 | 7/2004 |

OTHER PUBLICATIONS

U.S. Appl. No. 10/800.287; Barrett, et al.; Filed Mar. 12, 2004.

U.S. Appl. No. 10/800,309; Barrett, et al.; Filed Mar. 12, 2004.

Ding, et al., "Resource-Based Striping: an Efficient Striping Strategy for Video Servers Using Heterogeneous Disk-Subsystems", Multimedia Tools and Applications, vol. 19, No. 1, Jan. 2003, pp. 29-51.

Gonzalez, et al., "Load Sharing Based on Popularity in Distributed Video on Demand Systems", Proceedings 2002 IEEE Int'l. Conf. on Multimedia and Expo, vol. 1, Aug. 2002, pp. 5-8.

Lee, "Staggered Push-A Linearly Scalable Architecture for Push-Based Parallel Video Servers", IEEE Transactions on Multimedia, vol. 4, No. 4, Dec. 2002, pp. 423-434.

Lo, et al., "Deploy Multimedia-on-Demand Services over ADSL Networks", PCM 2002; Lecture Notes in Computer Science, vol. 2532, Dec. 2002, pp. 295-302.

Song, et al., "Replica Striping for Multi-Resolution Video Servers", IDMS/PROMS 2002; Lecture Notes in Computer Science, vol. 2515, No. 2002, pp. 300-312.

"Digital Headend Solutions; Tune in to Digital TV", retrieved from the Internet on Nov. 3, 2005, Available at <<http://www.tutsystems.com/digitalheadend/solutions/index.cfm>>, 1 page.

"Infovalue Experts; Info Value Unveils Industry's First Video Multicasting Solution with Instant Replay", retrieved from the internet on Nov. 3, 2005. Available at <<http://www.infovalue.com/links/news%20room/press%20releases/1999/Press_%20First_Multicasting_with_instant_Replay.pdf>>, 3 pages.

"MediaFLO; Introducing FLO Technology", retrieved from the Internet on Nov. 3, 2005, available at <<http://www.gualcomm.com/mediaflo/news/pdf/flo_whitepaper.pdf>>, pp. 1-8.

"Optibase MGW 2400", retrieved from the Internet Nov. 3, 2005; Available at <<http://www.epecomgraphics.com/optibase_mgw2400_features.html>>, 2 pages.

"QuickTime Streaming your Media in Real Time", retrieved from the Internet on Nov. 3, 2005, Accessible at <<http://www.apple.com.tw/quicktime/technologies/streaming/, 3 pages.

BenAbdelkader, et al., "Combining Holistic and Parametric Approaches for Gait Recognition," Submitted to IEEE Transactions on Pattern Analysis and Machine Intelligence, Dec. 2002. 37 pages.

BenAbdelkader, el al., "Person Identification Using Automatic Height and Stride Estimation," IEEE International Conference on Pattern Recognition, Aug. 11-15, 2002, pp. 1-4.

BenAbdelkader, et al., "Stride and Cadence as a Biometric in Automatic Person Identification and Verification," 5th International Conference on Automatic Face and Gesture Recognition, May 20, 2002, pp. 1-6.

BenAbdelkader, et al., "View-invariant Estimation of Height and Stride for Gait Recognition,", Workshop on Biometric Authentication (BIOMET), in association with ECCV 2002, Jun. 1, 2002, 12 pages.
BenAbdelkader, et al., "EigenGait: Motion-based Recognition of People Using Image Self-similarity," Proc. Intl. on Audio and Video-based Person Authentication (AVBPA), 2001, 11 pages.
BenAbdelkader, et al., "Motion-based Recognition of People in Eigengait Space," 5th International Conference on Automatic Face and Gesture Recognition, May 20, 2002, pp. 1-6.
Cutler, et al., "Robust Real-Time Periodic Motion Detection, Analysis, and Applications," IEEE Transactions on Pattern Analysis and Machine Intelligence (PAMI), vol. 22, No. 8, Aug. 2000, pp. 781-796.
Elgammal, et al., "Non-parametric Model for Background Subtraction," IEEE ICCV99 Frame Rate Workshop, IEEE 7th International Conference on Computer Vision, Kerkyra, Greece, Sep. 1999, pp. 1-17.
Tsai, R., "An Efficient and Accurate Camera Calibration Technique for 3d Machine Vision," Proceedings of the Computer Vision and Pattern Recognition, 1986, pp. 364-374.
Turk, et al., "Face Recognition Using Eigenfaces;" CVPR, 1991. pp. 588-591.
Haritaoglu, et al., "W4S: A Real-Time System for Detecting and Tracking People in 2 1/2 D," in European Conference on Computer Vision, 1998, 16 pages.
U.S. Appl. No. 10/218,675; Barrett, et at.; Filed Aug. 13, 2002.
U.S. Appl. No. 10/218,674; Barrett, et al.; Filed Aug. 13, 2002.
U.S. Appl. No. 11/010,200; Smith, et al.; Filed Dec. 10, 2004.
Gil, et al., "Simulation of a Mobility Prediction Scheme Based on Neuro-Fuzzy Theory in Mobile Computing",Simulation, Jul. 2000, vol. 75, No. 1, pp. 6-17.
"Multidimensional Database Technology", Computer, Dec. 2001, vol. 34, No. 12, pp. 40-46.
Wolfson, at al., "Modeling Moving Objects for Location Based Services", Lectures Notes in Computer Science, 2002, vol. 2538, pp. 46-58.
Zhang, et al., "Data Modeling of Moving Objects with GPS/GIS in Web Environment", International Conference on Communications, Circuits and Systems and West Sino Exposition Proceedings, 2002. vol. 2 pp. 1581-1585.
Zhang, et al., "The Cost Model of Moving Objects Communication with GPS", International Conference on Communications, Circuits and Systems and West Sino Exposition Proceedings, 2002, vol. 2, pp. 1576-1580.
Armitage, "Support for Multicast over UNI 3.0/3.1 based ATM Networks", RFC 2022, Standards Track, Nov. 1996; pp. 1-82.
Halvorsen et al., "Q-L/MRP: A Buffer Muffer Management Mechanism for QoS Support in a Multimedia DBMS", IEEE 1998, pp. 162-171.
Hurst, et al., "MPEG Splicing: A New Standard for Television-SMPTE 312M", SMPTE Journal, Nov. 1998, pp. 978-988.
Kamiyama et al., "Renegotiated CBR Transmission in Interactive Video-on-Demand System", IEE 1997, pp. 12-19.
Lu et al., "Experience in designing a TCP/IP based VOD system over a dedicated network", IEE 1997, pp. 282-268.
McKinley, et al., "Group Communication in Multichanel Networks with Staircase Interconnection Topologies", Computer Communication Review, ACM, Sep. 1989, vol. 19, No. 4, pp. 170-181.
Petit et al., "Bandwidth Resource Optimization in Video-On-Demand Network Architectures", IEE 1994, pp. 91-97.
State, et al.,"Active Network Based Management for QoS Assured Multicast Delivered Media", Joint 4th IEEE Int'l Conf. on ATM and High Speed Intelligent Internet Symposium, Apr. 2001, pp. 123-127.
Wee, et al., "Splicing MPEG Video Streams in the Compressed Domain", IEEE 1997, pp. 224-230.
Wu, et al., "Scalable Video Coding and Transport over Broad-Band Wireless Networks", Proceedings of the IEEE, Jan. 2001, vol. 89, No. 1, pp. 6-20.
Thou, et al., "On-line Scene Change Detection of Multicast (MBone) Video", Proceedings of the SPIE-The International Society for Optical Engineering, Nov. 1998, vol. 3527, pp. 271-282.
Murphy, "Overview of MPEG", retrieved on Mar. 29, 2007, at <<http://web.archive.org/web/20001203031200/http://www.eeng.dcu.ie/~murphyj/the/the/no . . . >>, pp. 1-3.
U.S. Appl. No. 10/218,675—Non Final Office Action Dated May 8, 2007.
Non Final Office Action Received for U.S. Appl. No. 10/218,675, Dated May 8, 2007. 20 Pages.
Non Final Office Action Received for U.S. Appl. No. 10/218,675, Dated Jan. 24, 2008. 20 Pages.
Final Office Action Received for U.S. Appl. No. 10/218,675, Dated Sep. 4, 2008. 18 Pages.
Non Final Office Action Received for U.S. Appl. No. 10/460,949, Dated Sep. 14, 2005. 11 Pages.
Non Final Office Action Received for U.S. Appl. No. 10/460,949, Dated Sep. 25, 2006. 18 Pages.
Non Final Office Action Received for U.S. Appl. No. 10/460,949, Dated Apr. 9, 2007. 20 Pages.
Final Office Action Received for U.S. Appl. No. 10/460,949, Dated Oct. 22, 2007. 19 Pages.
Non Final Office Action Received for U.S. Appl. No. 10/460,949, Dated Jan. 7, 2008. 24 Pages.
Non Final Office Action Received for U.S. Appl. No. 10/684,138, Dated Jul. 14, 2008. 26 Pages.
Non Final Office Action Received for U.S. Appl. No. 10/684,138, Dated Aug. 24, 2007. 32 Pages.
Final Office Action Received for U.S. Appl. No. 10/684,138, Dated Mar. 6, 2008. 22 Pages.
Non Final Office Action Received for U.S. Appl. No. 10/789,128, Dated Jul. 27, 2007. 21 Pages.
Final Office Action Received for U.S. Appl. No. 10/789,128, Dated Feb. 22, 2008. 22 Pages.
Non Final Office Action Received for U.S. Appl. No. 11/010,200, Dated Apr. 8, 2008. 11 Pages.
"Foreign Office Action", Japanese Application No. 2003-293004, (Jun. 25, 2010),6 pages.
"Foreign Office Action", Japanese Application No. 2003-293004, (Jul. 17, 2009),4 pages.
"Foreign Office Action", Japanese Application No. 2003-293004, (Dec. 21, 2010),4 pages.
"MediaFlo; Introducing FLO Technology", retrieved from the internet on Nov. 2, 2005, available at http://www.qualcomm.com/mediaflo/news/pdf/flo_whitepaper.pdf, (May 6, 2005),pp. 1-8.
"Examination Report", European Application No. 03016242.4, (Jul. 10, 2008),6 pages.
"Final Office Action", U.S. Appl. No. 10/218,675, (Sep. 4, 2008),17 pages.
"Foreign Office Action", Chinese Application No. 03154051.1, (Mar. 9, 2007),5 pages.
"Foreign Office Action", Chinese Application No. 03154051.1, (Feb. 29, 2008),4 pages.
"Foreign Office Action", Chinese Application No. 03154051.1, (Jun. 6, 2008),2 pages.
"Non Final Office Action", U.S. Appl. No. 10/218,675, (Jan. 24, 2008),20 pages.
"Non Final Office Action", U.S. Appl. No. 10/218,675, (May 8, 2007),19 pages.
"Non Final Office Action", U.S. Appl. No. 12/391,268, (Apr. 14, 2011),8 pages.
"Notice of Allowance", U.S. Appl. No. 10/218,675, (Nov. 28, 2008),6 pages.
"Search Report", European Application No. 03016242.4, (Jan. 29, 2004),4 pages.
"Supplemental Notice of Allowance", U.S. Appl. No. 10/218,675, (May 11, 2009),5 pages.
"Notice of Allowance", U.S. Appl. No. 12/391,268, (Jan. 24, 2012),7 pages.

* cited by examiner

FAST DIGITAL CHANNEL CHANGING

TECHNICAL FIELD

This disclosure relates in general to changing channels in a digital video environment and in particular, by way of example but not limitation, to reducing the video presentation latency when changing from one video stream to another video stream in a digital unicast network.

BACKGROUND

Television-based entertainment systems are expanding the programming and services that they offer. In addition to television programming content such as that found on broadcast and traditional cable networks, television service providers are adding on-demand video, as well as other interactive services, features, and applications. The existence of these specific services, features, and applications, as well as the continuing increase in the breadth of available general programming content, drives the adoption of digital network technology for television-based entertainment systems.

Digital technology enables satellite and cable operators to increase the number and kinds of services that they offer to subscribers and thus their average revenue per subscriber. Unfortunately, although digital technology offers many advantages to subscribers as compared to traditional analog networks, it also has a number of drawbacks. For example, changing channels in a digital television service takes two to three seconds. This channel changing latency annoys and frustrates users of the digital television service.

This and other drawbacks of digital technology lead to higher rates of subscriber churn, which means that a large percentage of subscribers that try digital television service switch back to traditional analog service within a short time period. Switching subscribers from analog to digital service involves expenditures for network operators that range from broad, general marketing costs down to individual incentives and installation expenses. Consequently, reducing subscriber churn can financially benefit satellite and cable operators.

Accordingly, for television-based entertainment systems, there is a need for schemes and techniques to reduce the churn out of digital service and back to traditional analog service that results from subscribers being dissatisfied with the slow channel changing experienced with digital television service.

SUMMARY

Fast channel changing in a digital-television-based entertainment network can be implemented, for example, by electing to tune to a channel at an opportune tuning time. In an exemplary implementation, a method includes: receiving a channel change request that indicates a requested new channel from a client device; preparing a broadcast video data stream of the requested new channel that is offset in time behind a current broadcast time for broadcast video data of the requested new channel; and streaming the broadcast video data stream to the client device responsive to the channel change request.

In another exemplary implementation, a system includes: a storage device that retains broadcast video data for multiple channels; a video data extractor that accesses the retained broadcast video data and retrieves an intra frame of broadcast video data that is in the past for a requested channel of the multiple channels; and a video data distributor that receives the retrieved intra frame of broadcast video data and transmits the retrieved intra frame of broadcast video data. The system may also include a video data booster that accesses the retained broadcast video data and retrieves a broadcast video data stream that follows the retrieved intra frame of broadcast video data, wherein the video data distributor further receives the retrieved broadcast video data stream and transmits the retrieved broadcast video data stream.

Other method, system, and arrangement implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
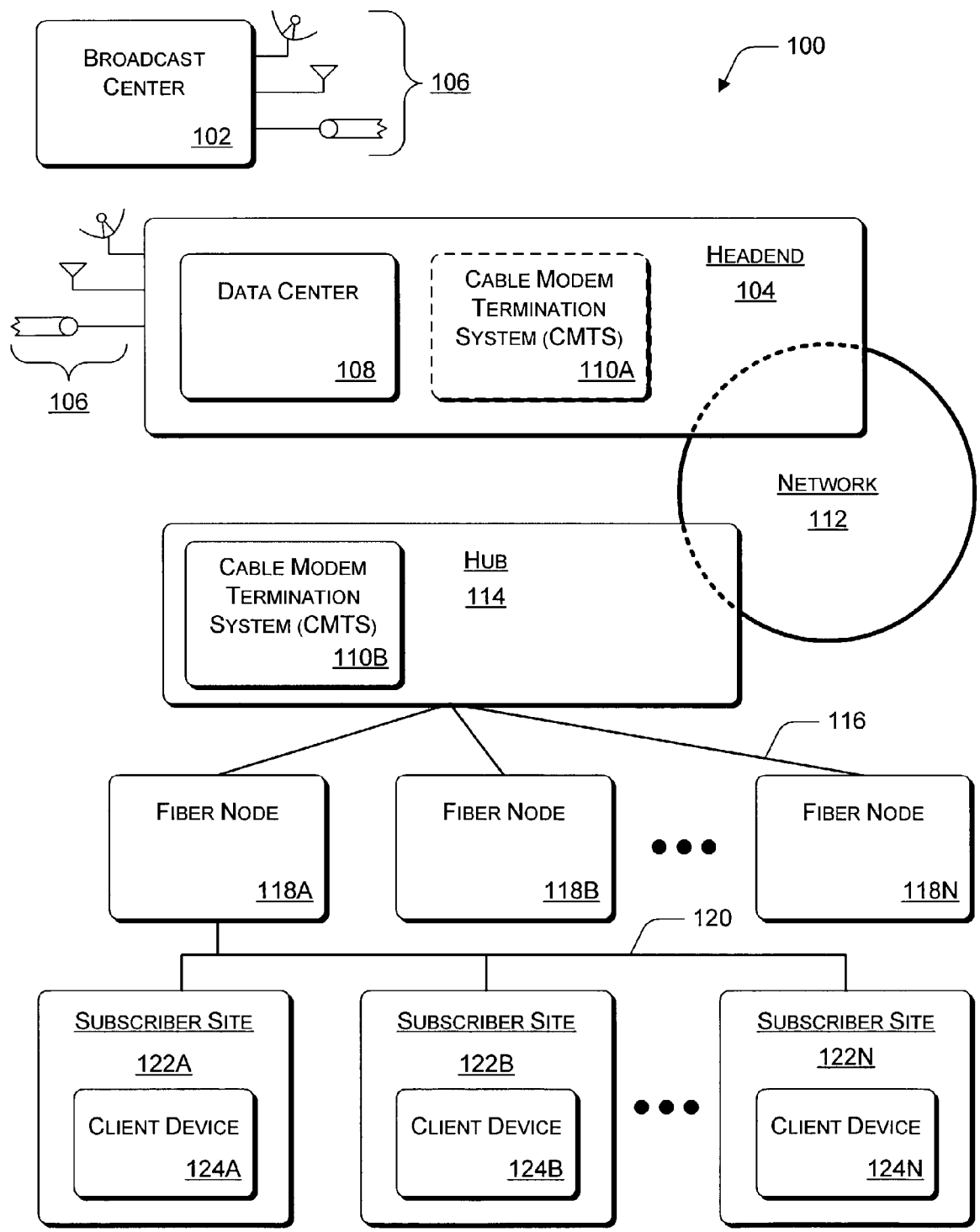
FIG. 1 illustrates an exemplary broadcast video distribution architecture in which the systems and methods for fast digital channel changing can be implemented.

FIG. 1 illustrates an exemplary broadcast video distribution architecture 100 in which the systems and methods for fast digital channel changing can be implemented. One or more broadcast centers 102 provide broadcast video to one or more headends 104 via one or more transmission media 106. Each broadcast center 102 and headend 104 is capable of interfacing with one or more transmission media 106 such as a satellite transmission medium, a radio frequency over-the-air transmission medium, a cable medium, and so forth. Hence, broadcast center 102 may be related to a satellite operator, a network television operator, a cable operator, and so forth.

Headend 104 includes at least one data center 108 that records the broadcast video that is received via transmission media 106 or any other media. The recording can be effectuated while the broadcast video is in a compressed data format, for example, in order to facilitate the ongoing storage of such broadcast video over days, weeks, or even indefinitely. The compression format may comport with a Moving Pictures Expert Group (MPEG) algorithm, such as MPEG-2, MPEG-4, and so forth. Other compression technologies may alternatively be employed, such as Microsoft Windows® Media, Advanced Simple Profile (ASP), Cintak, and so forth.

Headend 104 and a hub 114 may communicate across a network 112. Network 112 can be a fiber ring and may operate under a packet-based protocol, such as an Internet protocol (IP), IP over asynchronous transfer mode (ATM), and so forth. Packets can therefore be communicated between headend 104 and hub 114. Hub 114 may include a cable modem termination system (CMTS) 110B for terminating communications from downstream cable modems. If hub 114 (or another un-illustrated hub) does not include CMTS 110B, headend 104 may include a CMTS 110A for terminating the cable modem communications. Although only one hub 114 is illustrated in architecture 100, headend 104 may provide broadcast video to multiple ones of such hubs 114 via network 112. Headend 104 thus distributes broadcast video over network 112 to one or more hubs 114.

Hub 114 distributes the broadcast video over fiber lines 116 to one or more fiber nodes 118A, 118B . . . 118N. Each fiber node 118 outputs one or more coaxial lines 120, and each such coaxial line 120 includes coaxial line drops to multiple subscriber sites 122A, 122B . . . 122N. Subscriber sites 122A, 122B . . . 122N include client devices 124A, 124B . . . 124N, respectively. Subscriber sites 122 may be homes, businesses, and so forth. Each subscriber site 122 may have multiple such client devices 124 that are each directly or indirectly interfacing with one or more of coaxial lines 120. Client devices 124 may be computers, set-top boxes of varying capabilities, hand-held/portable electronic devices, digital televisions, and so forth. Each client device 124 may include an integrated video screen or may be coupled to a video screen. An exemplary implementation of a client device 124 is described below with reference to FIG. 4.

Figure 2:
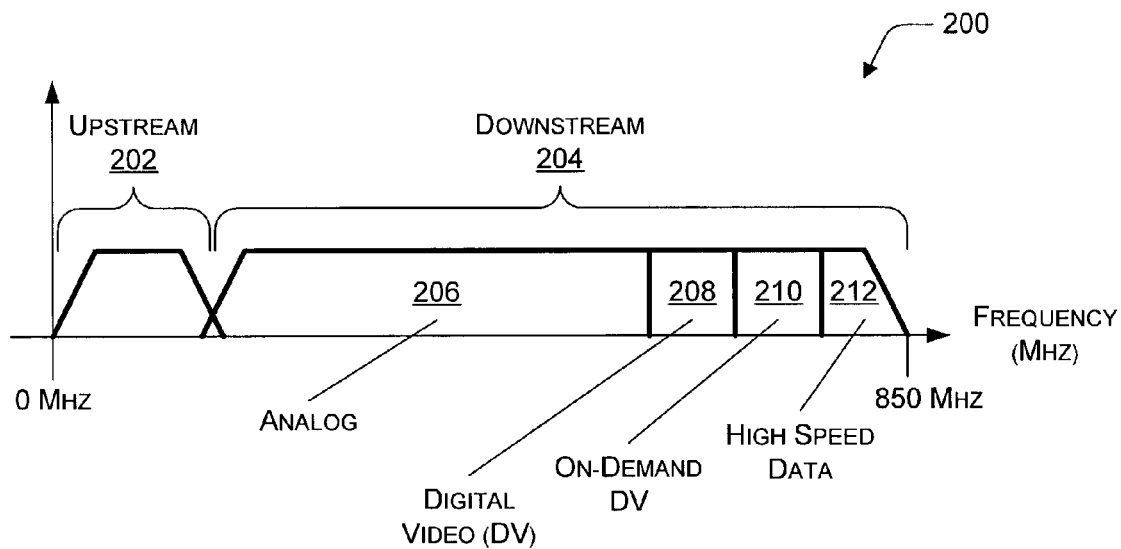
FIG. 2 illustrates an exemplary broadcast video distribution spectrum.

FIG. 2 illustrates an exemplary broadcast video distribution spectrum 200. Spectrum 200 extends from 0 Mhz to 850 Mhz and includes an upstream portion 202 and a downstream portion 204. Upstream portion 202 is allocated for communications from client devices 124 (of FIG. 1) to headend 104 for on demand video requests, cable modem requests, channel changing requests, and so forth. Downstream portion 204 is allocated for communications from headend 104 to client devices 124. These downstream communications include analog (video) portion 206, digital video (DV) portion 208, on-demand DV portion 210, and high speed data portion 212.

Analog portion 206 typically includes some number of 6 Mhz analog channels. DV portion 208 also includes some number of 6 Mhz channels, but these are dedicated to DV. Each of these 6 Mhz channels can carry multiple DV channels in a compressed format, such as eight (8) regular definition video channels. Although analog downstream communications do typically occupy a predominant fraction of downstream portion 204, spectrum 200 is not necessarily illustrated to scale.

On-demand DV portion 210 is dedicated to providing video in a digital format on request. Hence, this resource can be dynamically allocated among multiple client devices 124. High speed data portion 212 includes data that is transmitted to client devices 124, such as data that is forwarded to client devices 124 in response to previous requests by cable modems thereof using upstream portion 202. Such data may include information that originated from the Internet or similar sources. Other distributions/allocations of spectrum 200 may alternatively be employed. Regardless, it should be understood that the term "digital network" may refer to a digital portion of a combination digital and analog network, depending on the spectrum allocation.

In order for a subscriber to have access to the video, features, and other services provided through the digitally-allocated portion of spectrum 200, the subscriber needs to have subscribed to digital services. The subscriber then uses a client device 124 that is capable of interpreting, decoding, and displaying digital video. The digital video usually provides a picture that is superior to that of analog video, and the digital services are often convenient, informative, and otherwise enjoyable. Nevertheless, a large percentage of new digital subscribers churn out of the digital service because of one or more of the drawbacks of digital service. One such drawback is the lag time when changing to a digital channel, whether the change is from an analog channel or from another digital channel.

Specifically, changing television channels on a digital network takes longer than changing channels on a traditional analog network. When a viewer of analog television is "surfing" through analog channels, the viewer can switch to a new analog channel from a previous analog channel (or a previous digital channel) without experiencing a delay that is sufficiently long so as to be annoying or perhaps even detectable to the viewer. In fact, the delay is usually less than 250 milliseconds in an analog network. However, when a viewer of digital television is "surfing" through digital channels, the delay between when a new digital channel is requested and when the video of the new digital channel is displayed is detectable. Furthermore, the delay is sufficiently long so as to be annoying and even frustrating to the viewer.

Figure 3:
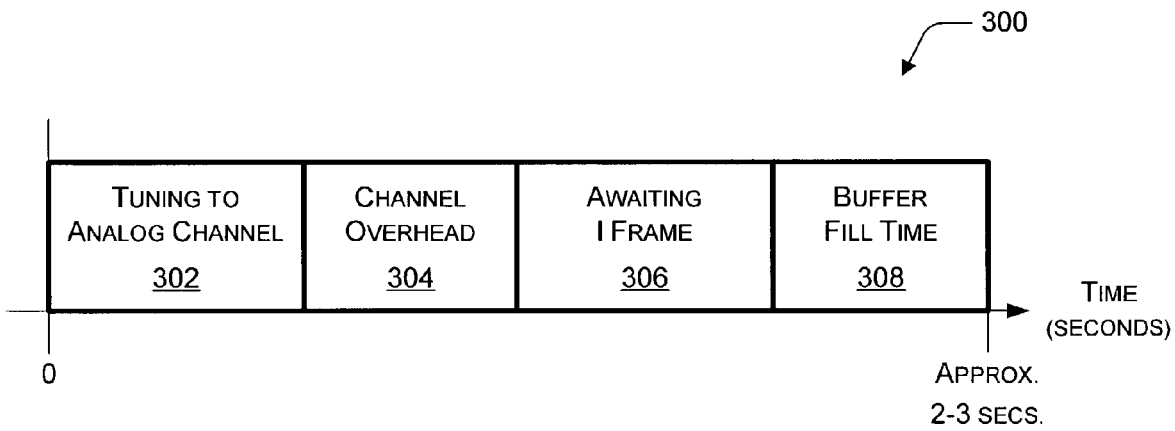
FIG. 3 illustrates a tuning time for a digital channel in accordance with a conventional approach.

FIG. 3 illustrates a tuning time 300 for a digital channel in accordance with a conventional approach. Tuning time 300 includes four (4) delay periods: tuning to analog channel delay 302, channel overhead delay 304, awaiting an I frame delay 306, and a buffer fill time delay 308. The digital video channels are located at specific frequencies along spectrum 200 (of FIG. 2) in groups such as 6-8 digital channels per 6 Mhz frequency. Consequently, there is an analog tune time delay 302 that elapses while tuning to the appropriate 6 Mhz slot. Especially because there are multiple digital channels per 6 Mhz channel, there is a channel overhead delay 304 that accounts for the vagaries of acquiring the underlying compressed video stream transport, such as an MPEG-2 stream.

When digital video data is transmitted as an MPEG stream, for example, the data is communicated as a series of frames. These frames are either intra frames (I frames) or non-intra frames (non-I frames), with non-I frames including predicted frames (P frames) and bi-directional frames (B frames). I frames are individual stand-alone images that may be decoded without reference to other images (either previous or subsequent). P frames are predicted forward in time; in other words, P frames only depend on a previous image. B frames, on the other hand, can be predicted forward and/or reverse in time.

Because only I frames stand alone in the data stream as reference frames, decoding of an MPEG or similarly constituted data stream needs to start at an I frame. I frames in MPEG-2 data streams for a standard definition digital television channel can arrive as infrequently as every two seconds. Assuming that channel change requests arrive on average somewhere in the middle between two I frames, the average delay time due to waiting for an I frame 306 is approximately one (1) second.

After an I frame is acquired, succeeding (non-I) frames are needed to continue the video presentation. These succeeding frames are applied to a decoding buffer until the decoding buffer is full. More particularly for an MPEG-based decoding process, decoding is not commenced in a broadcast environment until there are a sufficient number of frames in the decoding buffer to ensure that the buffer will not be emptied by the decoding process faster than it is being replenished. Hence, there is an additional delay corresponding to a buffer fill time 308. A typical buffer fill time 308 can last 500-750 milliseconds. These four (4) delay periods 302, 304, 306, and 308 of tuning time 300 can total approximately 2-3 seconds, which is a noticeable and annoyingly lengthy time period when channel "surfing".

There are also similar delays in television-based entertainment networks that utilize MPEG macroblocks for the I, P, and B units of the video data. In such networks, I macroblocks, P macroblocks, and B macroblocks are analogous to the I frames, P frames, and B frames. The various macroblocks are amalgamated to form images of the video. In fact, in a conventional digital channel changing environment for a cable network, the amalgamation is visible as the I macroblocks for an image are received, decoded, and displayed on a screen. The display of the I decoded I macroblocks is reminiscent of a waterfall inasmuch as the decoded I macroblocks appear first toward the top portion of the screen and gradually fill in the remainder of the screen, generally from the top to the bottom.

Figure 4:
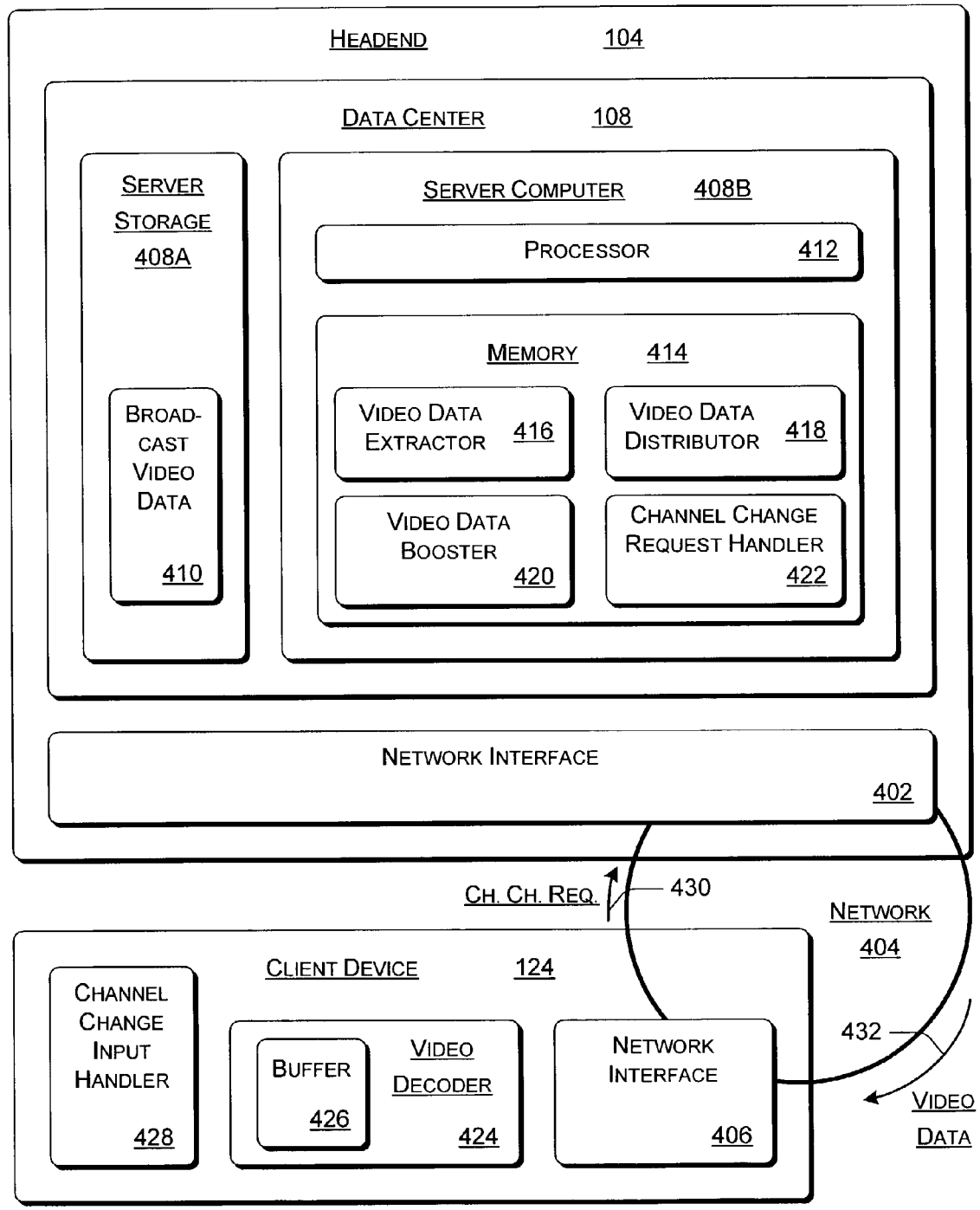
FIG. 4 illustrates an exemplary headend and an exemplary client device in which the systems and methods for fast digital channel changing can be implemented.

FIG. 4 illustrates an exemplary headend 104 and an exemplary client device 124 in which the systems and methods for fast digital channel changing can be implemented. Headend 104 uses a network interface 402 to communicate over a network 404, and client device 124 used a network interface 406 to communicate over network 404. Network 404 can be any two-way unicast network. For example, network 404 may enable the establishment of point to point Internet protocol (IP) sessions thereon. Alternatively, network 404 may be a video on demand (VOD) type network, a video over digital subscriber line (DSL)-based network, and so forth. Other implementations for network 404 may also be employed.

Network 404 may include one or more other nodes that are upstream of client device 124 in addition to headend 104. For example, hubs 114 (of FIG. 1) and fiber nodes 118 may be located between client device 124 and headend 104 for forwarding/routing packets or other communications therebetween. Additionally, network 404 may be realized as a combination of networks.

Network interfaces 402 and 406 may vary depending on the architecture of network 404. In an exemplary cable network implementation, network interface 402 includes a CMTS (such as CMTS 110A) if there is no other intervening CMTS 110 in network 404, and network interface 406 includes a cable modem. Network interface 402 and/or network interface 406 may also include components for interacting with an IP network, a DSL network, and so forth. These components may include a receiver, a transmitter, a transceiver, etc. that are adapted to interact with the appropriate network.

In an exemplary described implementation, broadcast video distribution from headend 104 to client device 124 is effectuated generally as follows. A point to point IP session is established between headend 104 and client device 124. Broadcast video data 432 for a specific channel is streamed to client device 124 across network 404. Thus, each client device 124 receives its own designated broadcast video data stream according to its corresponding requested channel. As a consequence, each fiber node 118 (of FIG. 1), if present, has a different current allocation of the two-way portion of the network that is intended for downstream transmissions to client devices 124. This two-way spectrum portion may correspond to DV portion 208 (of FIG. 2).

Using point to point IP sessions eliminates the analog tune time, as well as the channel overhead delay, because there is no analog tuning to a designated frequency channel. Client devices 124 are "tuned" to an IP data source such that the digital "tuning" between channels occurs in the IP domain at headend 104. When changing from a first channel to a second channel, an IP switch (not shown) at headend 104 notes that an IP address of client device 124 is now designated to receive a broadcast video data stream that corresponds to the second channel. Although the analog channel tuning time delay is eliminated, a new delay is introduced as a result of the two-way communication between client device 124 and headend 104. This new delay is described further below.

Client device 124 includes a channel change input handler 428, a video decoder 424, and network interface 406. Video decoder 424 includes a buffer 426 for storing received broadcast video data prior to decoding. Channel change input handler 428 receives a channel change input from a user (not shown) that orders a change to a requested channel. The channel change input may be received from a remote control, a keyboard, a personal digital assistant (PDA) or similar, a touch-sensitive screen, integrated keys, and so forth.

Channel change input handler 428 may be realized as executable instructions and/or hardware, software, firmware, or some combination thereof. Channel change input handler 428 constructs a channel change request 430 in packet form that includes an indicator of the requested channel. Channel change request 430 is provided from channel change input handler 428 to network interface 406 of client device 124 for transmission over network 404.

Network interface 402 of headend 104 receives channel change request 430 via network 404. Network interface 402 provides channel change request 430 to data center 108. Data center 108, in an exemplary implementation, includes a server architecture 408. Server architecture 408 includes a server storage 408A and a server computer 408B. Server storage 408A includes a storage device (not explicitly shown) that comprises mass memory storage, such as a disk-based storage device. Examples of suitable disk-based storage devices/systems include a redundant array of independent/ inexpensive disks (RAID), a Fibre Channel storage device, and so forth.

Server storage 408A stores broadcast video data 410. Broadcast video data is broadcast (e.g., from broadcast center 102 (of FIG. 1)) to headend 104 in a compressed format. In an exemplary described implementation, the compressed format comprises a digital stream in accordance with an MPEG protocol, such as MPEG-4. However, other compression formats may alternatively be used. As the compressed digital stream arrives at headend 104, it is stored as broadcast video data 410. Thus, server storage 408A retains broadcast video data 410 in a compressed digital format. Server storage 408A may retain broadcast video data 410 for multiple channels as it is received over hours, days, weeks, and even essentially perpetually.

Server computer 408B enables access to the retained broadcast video data 410 of server storage 408A. Server computer 408B includes one or more processors 412 and one or more memories 414. Although not shown, server computer 408B may also include other components such as input/output interfaces; a local disk drive; hardware and/or software for encoding, decoding, and otherwise manipulating video data, and so forth. Memory 414 may include a non-volatile memory such as disk drive(s) or flash memory and/or volatile memory such as random access memory (RAM). In an exemplary described implementation, memory 414 includes electronically-executable instructions.

Specifically, memory 414 includes the following electronically-executable instructions: a channel change request handler 422, a video data extractor 416, a video data booster 420, and a video data distributor 418. The electronically-executable instructions of memory 414 may be executed on processor 412 to effectuate functions as described below. In alternative implementations, one or more of channel change request handler 422, video data extractor 416, video data booster 420, and video data distributor 418 may be stored in a memory such that they are hardware encoded for automatic execution and/or for faster execution by a processor 412.

Network interface 402 forwards channel change request 430 to channel change request handler 422. Channel change request handler 422 isolates the requested channel from channel change request 430 and provides the requested channel to video data extractor 416. Video data extractor 416 is responsible, at least partially, for extracting broadcast video data for the requested channel from broadcast video data 410 of server storage 408A. Video data extractor 416 compensates for channel change requests 430 that arrive in between two intra frames by ensuring that the tuning actually takes place at a more opportune time.

In other words, to avoid having to wait for an I frame, the broadcast video data delivery is backed up in time into the past. The delivery of broadcast video data 410 to client device 124 for the requested channel is offset in time behind a current broadcast time of the requested channel. Consequently, the viewer at client device 124 is presented with broadcast video that is prior to a current broadcast time and thus not current, but video presentation lag times during channel "surfing" are reduced.

Figure 5:
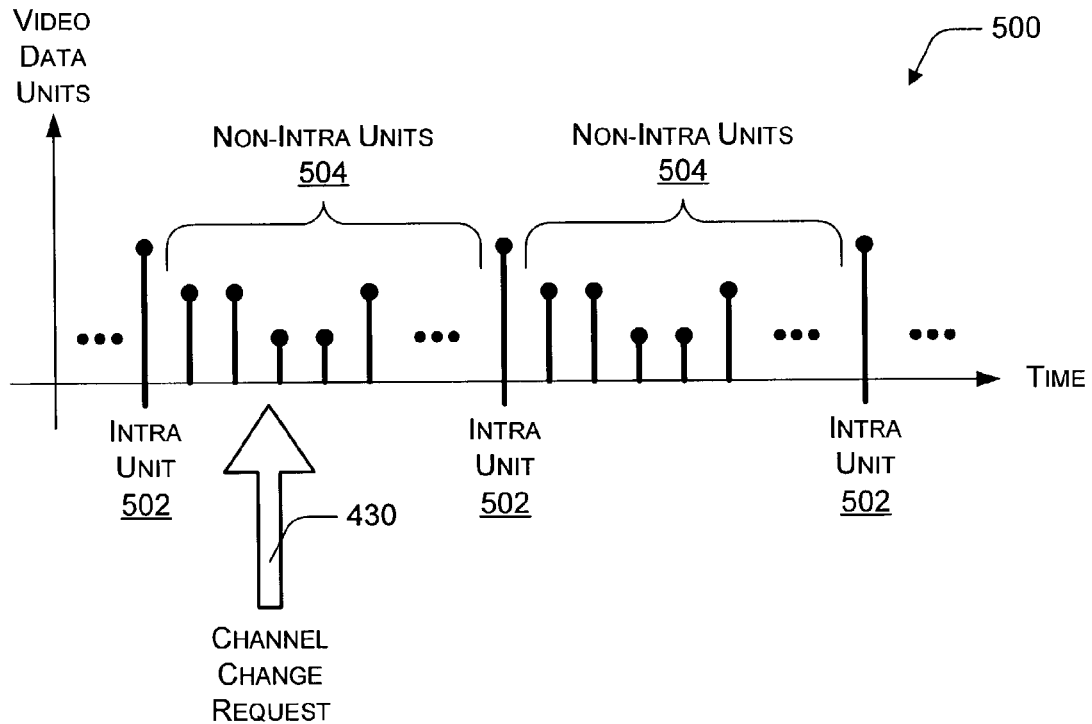
FIG. 5 illustrates an exemplary data stream for compressed video.

FIG. 5 illustrates an exemplary data stream 500 for compressed video. Data stream 500 is graphed with video data units rising upward parallel to the ordinate axis and with time increasing in the rightward direction along the abscissa axis. Generally, video data units of data stream 500 comprise units of compressed video images. Specifically, these units may correspond to frames, (macro) blocks, and so forth of a video compression protocol such as MPEG. Data stream 500 includes intra units (I units) 502 and non-intra units (non-I units) 504.

In exemplary described implementations, I units 502 may correspond to I frames, I macroblocks, and so forth. Non-I units 504 may correspond to P frames, P macroblocks, B frames, B macroblocks, and so forth. Thus, I units 502 may in general be decoded without reference to other units, regardless of the relevant compression algorithm. In other words, an intra unit may refer to any data segment that may be decoded and subsequently displayed without reference to any other data segment, regardless of whether the data segment is compressed in accordance with MPEG in particular or any other coding algorithm in general. Similarly, a complete or intra frame may refer to any data frame that may be decoded and subsequently displayed without reference to any other data frame and that completely fills a designated image area. Such a designated image area may correspond to a full screen, the entirety of any allocated video display space, a full window, and so forth.

I units 502 and non-I units 504 for each digital video channel are received at headend 104 (of FIG. 4) from broadcast center 102 (of FIG. 1) and stored as broadcast video data 410 at server storage 408A over time. Broadcast video data 410 is thus retained at data center 108, and it is available for immediate or subsequent streaming to client devices 124.

I units 502 arrive from time to time, such as at approximate intervals or every predetermined period, along data stream 500 at headend 104. In between I units 502, a multiple of non-I units 504 arrive along data stream 500. Usually, channel change requests 430 arrive at headend 104 from client devices 124 at times in between two I units 502. Waiting for the next I unit 502 to arrive before beginning video decoding adds, on average, one second of delay to the digital channel tuning time for an MPEG-2 stream. As video decoders evolve and become more bandwidth efficient, this average delay time due to waiting for the next I unit 502 can stretch to five (5) or more seconds.

However, instead of waiting for the arrival of the next I unit 502, video data extractor 416 (of FIG. 4) seeks backward in time and retrieves a previous I unit 502. This previous I unit 502 is, in some implementations, the most-recently-received I unit 502. However, any previous I unit 502 may alternatively be sought and/or retrieved. For example, if there are an insufficient number of intervening non-I units 504 between a most-recently-received I unit 502 and the time at which a channel change request 430 is received, then the second most-recently-received I unit 502 may be sought and retrieved. The sufficiency of the number of intervening non-I units 504 is determinable responsive to the size of buffer 426 of client device 124. This buffer 426 may be filled with the intervening non-I units 504; this optional buffer filling is described further below with reference to video data booster 420.

In other words, video data extractor 416 accesses server storage 408A to retrieve an I unit 502 of broadcast video data 410 that is in the past with respect to a current broadcast time. Specifically, video data extractor 416 accesses a portion of broadcast video data 410 that corresponds to the requested channel of channel change request 430. Video data extractor 416 seeks backward in time (e.g., to the left of channel change request 430 along data stream 500) to locate and then retrieve the most recently received I unit 502 for the requested channel. This I unit 502 is provided to video data distributor 418.

With respect to possible buffer fill time delays, channel changing delays due to a buffer fill time of buffer 426 can be avoided or reduced with video data booster 420. Video data booster 420 receives the requested channel information from channel change request handler 422 or video data extractor 416. Video data booster 420 also receives from video data extractor 416 the location along data stream 500 of the retrieved (e.g., the most-recently-received) I unit 502. Video data booster 420 retrieves a number of immediately-succeeding non-I units 504 from along data stream 500. The number of non-I units 504 are sufficient in size so as to fill buffer 426 of video decoder 424.

Specifically, video data booster 420 accesses stored broadcast video data 410 of server storage 408A at a location that corresponds to the requested channel. Video data booster 420 is aware of the size of buffer 426 of client device 124. Video data booster 420 may be informed of the size requirements of buffer 426 by an operator of headend 104, by client device 124, and so forth. Client device 124 may inform video data booster 420 of this buffer size when client device 124 is connected to network 404, when a point to point session is established, with channel change request 430, and so forth.

Although the physical or allocated size of an actual buffer for video decoder 424 may be of any size, buffer 426 refers to a minimum level or amount of coded broadcast video data that is necessary or preferred to be in reserve when decoding commences. This minimum level or amount may depend on the particular compression/decompression technology employed, and buffer 426 may correspond to any such minimum size or larger. For an exemplary MPEG-2 coding implementation, buffer 426 corresponds to approximately 500 kilobytes. For an exemplary MPEG-4 coding implementation, buffer 426 corresponds to approximately four (4) megabytes. Video data booster 420 thus retrieves non-I units 504, which follow the most-recently-received I unit 502, to a size that is sufficient to fill buffer 426. This retrieval is performed at a boost rate that exceeds the streaming rate for data stream 500. This buffer 426-sized set of non-I units 504 is provided to video data distributor 418.

Consequently, video data distributor 418 accepts the most-recently-received I unit 502 from video data extractor 416 and the multiple non-I units 504 from video data booster 420. Video data distributor 418 provides the most-recently-received I unit 502 and the multiple non-I units 504 of broadcast video data to network interface 402. Network interface 402 transmits the broadcast video data over network 404 as video data packet(s) 432. Client device 124 receives the video data packet(s) 432 via network 404 at network interface 406.

Video data distributor 418 orchestrates the broadcast video data distribution in any desired order. For example, the most-recently-received I unit 502 and the multiple non-I units 504 may be collected at video data distributor 418 and jointly transmitted. Also, the most-recently-received I unit 502 may be transmitted under the control of video data distributor 418 while video data booster 420 is retrieving the multiple non-I units 504 from broadcast video data 410. Other distributions may alternatively be employed.

It should be noted that the electronically-executed instructions of channel change request handler 422, video data extractor 416, video data booster 420, and video data distributor 418 may be combined or otherwise alternatively organized. For example, the electronically-executed instructions of video data distributor 418 may be incorporated into video data extractor 416 and/or video data booster 420.

After network interface 406 of client device 124 receives the broadcast video data for the requested channel, network interface 406 forwards the most-recently-received I unit 502 and the multiple non-I units 504 that follow thereafter of the broadcast video data to video decoder 424. Video decoder 424 decodes the most-recently-received I unit 502 in preparation for rendering the video image on a screen. Video decoder 424 places the multiple non-I units 504 into buffer 426 for subsequent decoding and video presentation on the screen.

Buffer 426 may be realized as a dedicated and/or specialized memory, as part of a memory that is shared for other purposes, and so forth. Although not shown, client device 124 may also include other components and/or executable instructions, such as an operating system, analog tuners, non-volatile memory storage, RAM, audio/video outputs, one or more specialized and/or general-purpose processors, and so forth.

Figure 6:
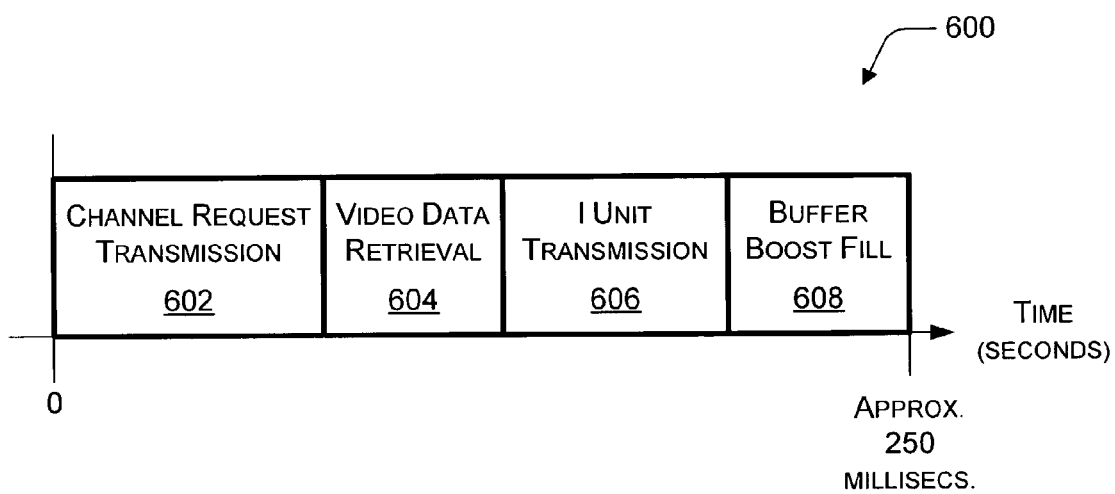
FIG. 6 illustrates a fast tuning time for a digital channel as described herein.

FIG. 6 illustrates a fast tuning time 600 for a digital channel as described herein. Generally, delays for tuning to an analog channel, for channel overhead, and for waiting for an I frame are eliminated. The traditional buffer fill time is also at least reduced. However, new delays are introduced. Specifically, fast tuning time 600 includes four (4) delay periods: channel request transmission delay 602, video data retrieval delay 604, I unit transmission delay 606, and buffer boost fill delay 608.

Channel request transmission delay 602 reflects the time for channel change request 430 to be formulated in client device 124 and transmitted to headend 104 across network 404. Video data retrieval delay 604 reflects the time that elapses while server computer 408B retrieves the most-recently-received I unit 502. I unit transmission delay 606 reflects the time for the most-recently-received I unit 502 to be transmitted from headend 104 to client device 124. These three delays 602, 604, and 606 occupy approximately 20, 100, and 100 milliseconds, respectively. There are therefore approximately 220 milliseconds total that elapse between the channel change input from a viewer and the presentation of an initial image.

Fast tuning time 600 also includes buffer boost fill delay 608. Buffer boost fill delay 608 reflects the time required (i) to retrieve from broadcast video data 410 the multiple non-I units 504 that are of a size that is sufficient to fill buffer 426 and (ii) to transmit them from headend 104 to client device 124. The impact of either or both of these parts of buffer boost fill delay 608 may be reduced when they are overlapped in time with one or both of delays 604 and 606.

Buffer boost fill delay 608 is approximately 30 milliseconds, but this time period may vary significantly depending on the available bandwidth. Hence, the entire fast tuning time 600 is approximately 250 milliseconds. Furthermore, even a short buffer boost fill delay 608 may be essentially eliminated if the burst of broadcast video data, after the initial I unit 502, is transmitted at a rate of data delivery that is guaranteed to exceed the playout speed of the video.

In other words, the multiple non-I units 504 may be relatively quickly sent to client device 124 by transmitting them at a rate that exceeds a typical broadcast video data stream consumption rate at client device 124 in order to reduce or eliminate buffer boost fill delay 608. This relatively quick transmission is enabled by "borrowing" transient excess capacity from other subscribers on the same or a different digital channel.

Figure 7:
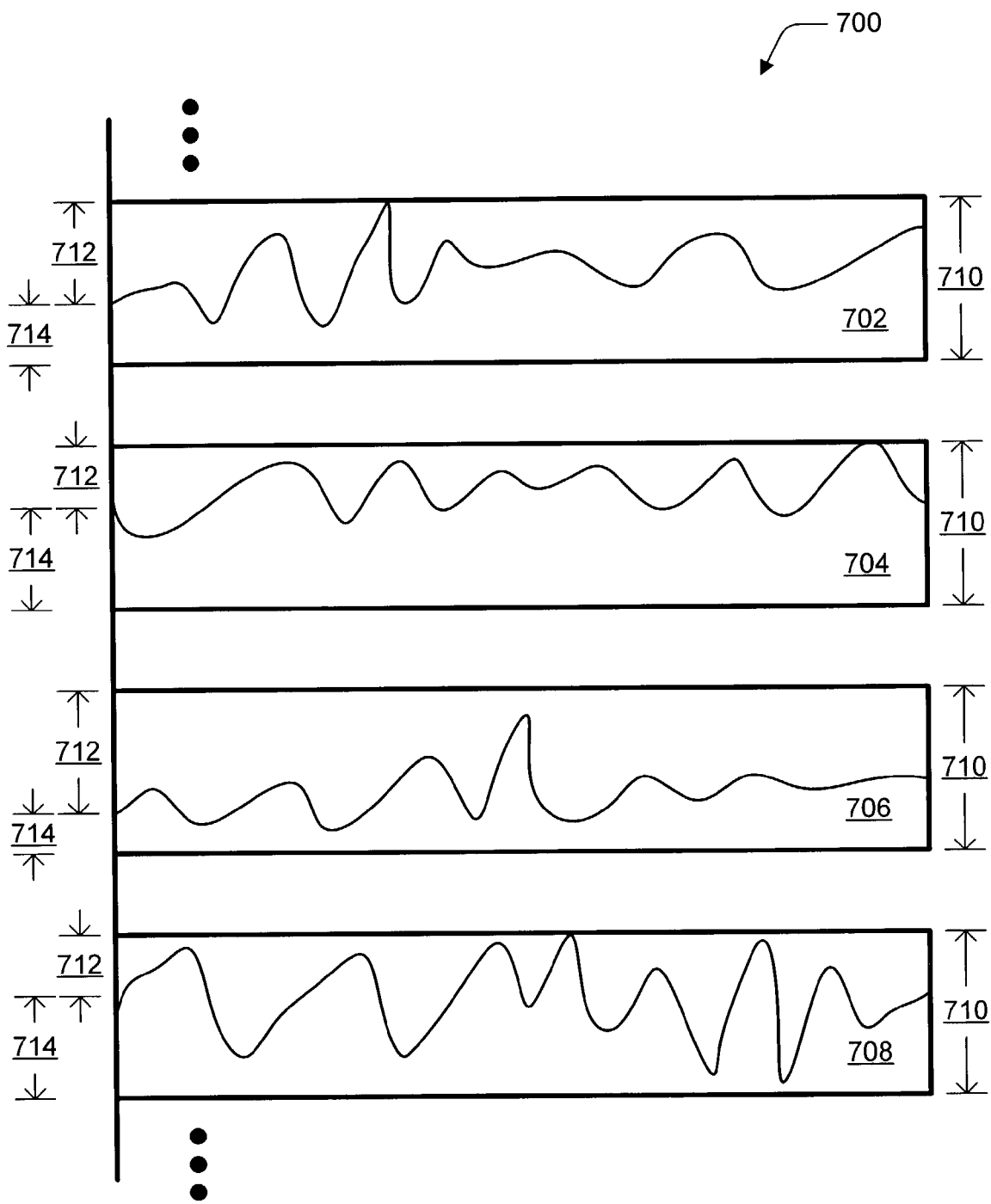
FIG. 7 is a set of graphs that illustrate transient excess bandwidth that may be shared among subscribers.

FIG. 7 is a set of graphs 700 that illustrate transient excess bandwidth 712 that may be shared among subscribers. Each digital channel of DV portion 208 of spectrum 200 (of FIG. 2) may support multiple subscribers, depending on the total bits per channel, the definition of the video, the compression technology, and so forth. Although 30-40 or more subscribers may be sharing a digital channel, only four (4) streams 702, 704, 706, and 708 for broadcast video data that is being transmitted from headend 104 to four (4) different client devices 124 are illustrated in the set of graphs 700.

These four streams 702, 704, 706, and 708 of broadcast video data are each allocated a maximum bandwidth 710. The current bandwidth utilization 714 per stream varies depending on the associated video content at any given time. The difference between maximum (allocated) bandwidth 710 and current bandwidth utilization 714 is transient excess bandwidth 712. This transient excess bandwidth 712, which is otherwise underutilized by a given subscriber at any given moment, may be shared by other subscribers when tuning to a new digital channel. In short, transient excess bandwidth 712 is used to fill buffer 426 with the multiple non-I units 504 that follow the most-recently-received I unit 502 at a rate that exceeds the decoding of the video data units by video decoder 424. Hence, presentation of the broadcast video may commence immediately following, or practically immediately following, receipt of the initial I unit 502, thus potentially eliminating buffer boost fill delay 608.

Fast digital channel changing may be described in the general context of electronically-executable instructions. Generally, electronically-executable instructions include routines, programs, objects, components, data structures, and the like that perform particular functions or implement particular abstract data types. Fast digital channel changing, as described in certain implementations herein, may be practiced in distributed computing environments where functions are performed by remotely-linked processing devices that are connected through a communications network. Especially in a distributed computing environment, electronically-executable instructions may be located in separate storage media and executed by different processors.

Figure 8:
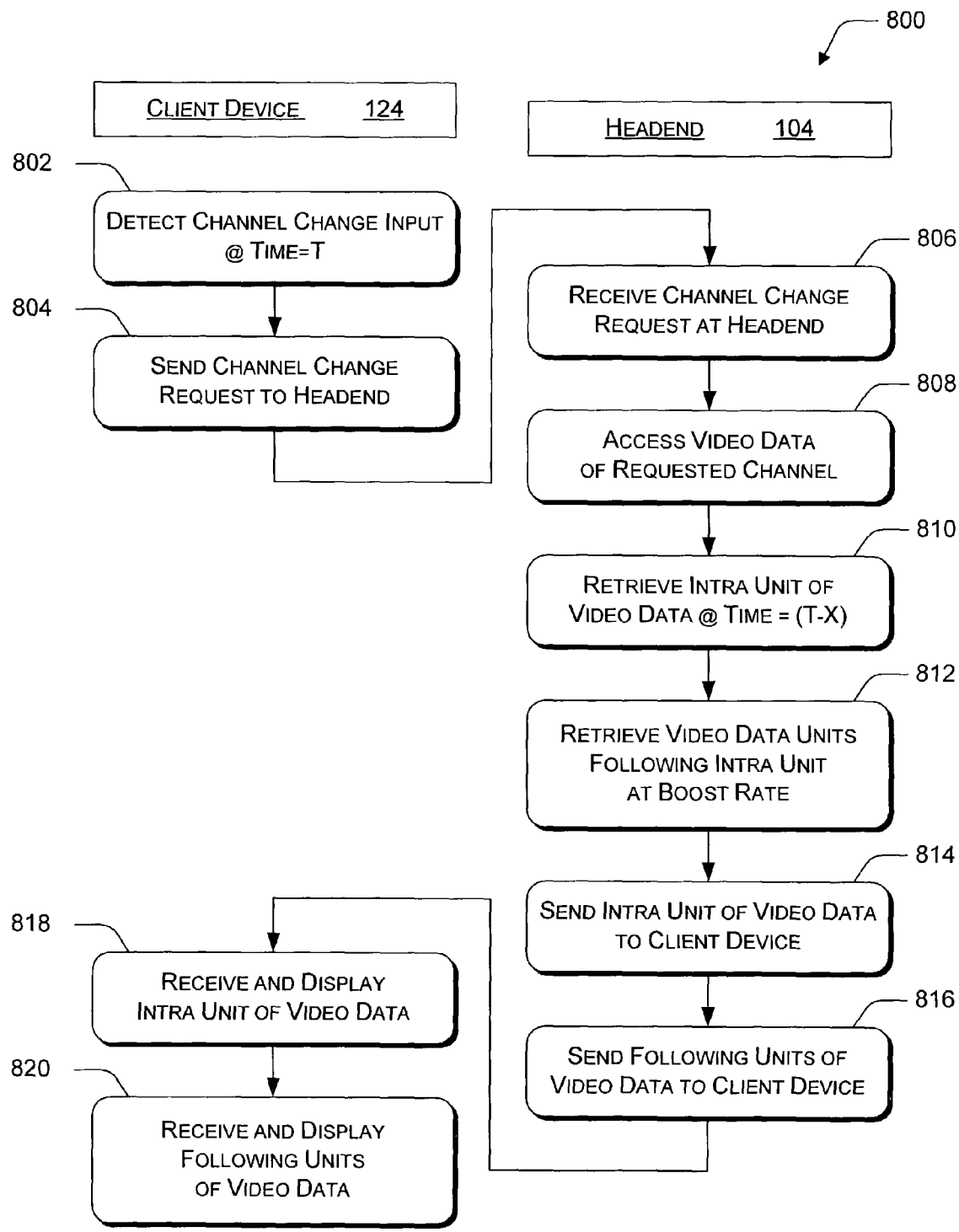
FIG. 8 is a flow diagram that illustrates an exemplary method for fast digital channel changing.

The methods and processes of FIG. 8 are illustrated in a flow diagram that is divided into multiple method blocks. However, the order in which the methods and processes are described is not intended to be construed as a limitation, and any number of the described blocks can be combined in any order to implement one or more methods or processes for fast digital channel changing. Furthermore, although the methods and processes are described below with reference to the broadcast video distribution implementations of FIGS. 1, 4, 5, etc. where applicable, the methods and processes can be implemented in any suitable hardware, software, firmware, or combination thereof and using any suitable network architectures, video compression technologies, and so forth.

FIG. 8 is a flow diagram 800 that illustrates an exemplary method for fast digital channel changing. Flow diagram 800 includes ten (10) method blocks 802820. A client device 124 may implement four (4) blocks 802, 804, 818, and 820. A headend 104 may implement six (6) blocks 806, 808, 810, 812, 814, and 816. Alternatively, another network node that is upstream of the client device 124, such as a hub 114, may implement the six blocks 806-816. Furthermore, the actions of the six blocks 806-816 may be implemented by more than one upstream node, for example when different channels and/or programming times are stored as broadcast video data 410 in different data centers 108 (e.g., to implement data caching).

At block 802, a channel change input is detected at a time=T at the client device. For example, the client device 124 may receive a command from a subscriber via a remote control to change from a first channel to a second requested channel at a time=T. In response, the client device 124 prepares a channel change request 430. The channel change request 430 includes an indicator of the requested channel and may be in packet form. At block 804, the channel change request is sent to the headend from the client device. For example, the client device 124 may transmit the channel change request 430 to the headend 104 over a network 404, optionally through one or more intermediate upstream nodes such as a fiber node 118 or a hub 114.

At block 806, the channel change request is received at the headend from the client device. For example, the channel change request 430 may be received at a network interface 402 of the headend 104 via the network 404. At block 808, video data of the requested channel is accessed. For example, compressed broadcast video data of broadcast video data 410 that corresponds to the requested channel is located and accessed.

At block 810, an intra unit of video data at a time=(T-X) is retrieved. For example, where "X" equals an amount of temporal distance between the time of receiving a channel change input at the client device 124 and the time of receipt of a most recent past intra unit 502 at the headend 104, the intra unit 502 at time=(TX) is retrieved from the broadcast video data 410 for the requested channel. In situations where the channel change request 430 transmission time from the client device 124 to the headend 104 is neither negligible nor otherwise discounted, the time=T may be considered to be the time at which the channel change request 430 is received at the headend 104. Thus, the temporal distance "X" along the broadcast video data stream of the requested channel in such situations is somewhat greater to account for the additional elapsed time of the channel change request 430 transmission, and the consequential receipt of additional non-intra units 504 at the headend 104.

At block 812, video data units that follow the located and/or retrieved intra unit are retrieved at a boost rate. For example, a sufficient number of non-intra broadcast video data units 504 are retrieved from the broadcast video data 410 of server storage 408A by server computer 408B at a rate that exceeds the expected decoding and playout speed thereof at the client device 124. These two retrievals of blocks 810 and 812 may be effectively completed as a single retrieval.

At block 814, the retrieved intra unit of video data is sent to the client device from the headend. For example, the intra unit 502 of broadcast video data is transmitted from the headend 104 over the network 404 to the client device 124, as part of video data 432. At block 816, the following units of video data are sent to the client device from the headend. For example, the non-intra units 504 of broadcast video data that temporally follow the intra unit 502 in the stream 500 for the requested channel are transmitted from the headend 104 to the client device 124 across the network 404, as part of the video data 432. Although the intra unit 502 of video data is decoded and displayed first at the client device 124, the units 502 and 504 of video data may be transmitted to the client device 124 in any suitable order or organizational grouping.

At block 818, the client device receives and displays the intra unit of video data. For example, the client device 124 may receive the intra unit 502 of broadcast video data as part of the video data 432 via the network 404 at a network interface 406. The network interface 406 provides the intra unit 502 of broadcast video data to a video decoder 424 so that the decoding and subsequent display 2 thereof may begin. At block 820, the client device receives and displays the following units of video data. For example, the client device 124 may receive the non-intra units 504 of broadcast video data that follow the intra unit 502 as part of the video data 432 via the network 404 at the network interface 406. The network interface 406 provides the following non-intra units 504 of broadcast video data to a buffer 426 of the video decoder 424 so that the decoding and subsequent display thereof may begin with reference to the intra unit 502 of broadcast video data.

Although systems and methods have been described in language specific to structural and functional features and/or methods, it is to be understood that the invention defined in the appended claims is not necessarily limited to the specific features or methods described. Rather, the specific features and methods are disclosed as exemplary forms of implementing the claimed invention.

The invention claimed is:

1. A system for tuning channels in a digital video broadcast network, the system comprising:
    a receiver configured to receive at a server a request to tune to a new digital channel from a client device;
    a broadcast video extractor configured to seek for and retrieve a previous complete frame of broadcast video for the new digital channel from a storage device responsive to the received request;
    a broadcast video booster configured to access the storage device and retrieve a plurality of incomplete frames of broadcast video that follow the retrieved previous complete frame of broadcast video; and
    a transmitter configured to:
        reallocate transient excess bandwidth from one or more other client devices to the client device responsive to receiving the request to tune to the new digital channel, the transient excess bandwidth comprising at least a portion of a difference between an amount of bandwidth allocated to the one or more other client devices and an amount of bandwidth currently being utilized by the one or more other client devices; and
        transmit the retrieved plurality of incomplete frames of broadcast video to the client device at a transmission rate that exceeds a real-time transmission rate of the broadcast video using the transient excess bandwidth to fill the video decoder buffer with the retrieved plurality of incomplete frames of broadcast video, the transmitted retrieved plurality of incomplete frames of broadcast video being offset in time behind a current broadcast time of the new digital channel, the offset in time comprising a difference between a time that the request is received and a broadcast time of the previous complete frame of broadcast video, the plurality of incomplete frames of broadcast video being retrievable and transmittable over a duration of time that is less than a period of time used to seek for, retrieve, and transmit the previous complete frame of broadcast video.

2. The system as recited in claim 1, further comprising wherein:
the transmitter is to transmit the retrieved previous complete frame of broadcast video to the client device to thereby enable the client device to display an image of the new digital channel.

3. The system as recited in claim 1, further comprising wherein:
the broadcast video booster is to access the storage device and retrieve a number of the a plurality of incomplete frames of broadcast video that is sufficient to fill a decoding buffer at the client device that follow the retrieved previous complete frame of broadcast video.

4. The system as recited in claim 1, wherein the retrieved previous complete frame of broadcast video comprises a retrieved most-recently-received complete frame of broadcast video.

5. The system as recited in claim 1, wherein the retrieved previous complete frame of broadcast video is complete such that the client device can decode and cause to be displayed an image thereof without reference to any other frame of broadcast video.

6. A method for tuning channels in a digital video broadcast network, the method comprising:
receiving at a server a request to tune to a requested digital channel from a client device;
seeking for a previous complete frame of broadcast video for the requested digital channel;
retrieving the previous complete frame of broadcast video for the requested digital channel;
transmitting the previous complete frame of broadcast video for the requested digital channel to the client device to enable the client device to display an image of the requested digital channel;
retrieving a plurality of incomplete frames of broadcast video that follow the previous complete frame of broadcast video for the requested digital channel;
reallocating transient excess bandwidth from one or more other client devices to the client device responsive to receiving the request to tune to the requested digital channel, the transient excess bandwidth comprising at least a portion of a difference between an amount of bandwidth allocated to the one or more other client devices and an amount of bandwidth currently being utilized by the one or more other client devices; and
transmitting, to the client device, the plurality of incomplete frames of broadcast video at a transmission rate that exceeds a real-time transmission rate of the broadcast video using the transient excess bandwidth to fill the video decoder buffer with the plurality of incomplete frames of broadcast video, the transmitted plurality of incomplete frames of broadcast video being offset in time behind a current broadcast time of the requested digital channel, the offset in time comprising a difference between a time that the request is received and a broadcast time of the previous complete frame of broadcast video, the plurality of incomplete frames being retrieved and transmitted over a duration of time that is less than a period of time used for the seeking, retrieving, and transmitting of the previous complete frame.

7. A system for accelerating channel changing in a video broadcast environment, the system comprising:
a storage device configured to retain broadcast video data for a plurality of digital channels;
a video data extractor configured to access the retained broadcast video data and retrieve an intra frame of broadcast video data that is in the past for a requested digital channel, requested by a client device, of the plurality of digital channels;
a video data booster configured to access the retained broadcast video data and retrieve a broadcast video data stream that follows the retrieved intra frame of broadcast video data; and
a video data distributor configured to:
receive the retrieved intra frame of broadcast video data;
transmit the retrieved intra frame of broadcast video data;
receive the retrieved broadcast video data stream;
reallocate transient excess bandwidth from one or more other client devices to the client device responsive to receiving a channel change request by the client device, the transient excess bandwidth comprising at least a portion of a difference between an amount of bandwidth allocated to the one or more other client devices and an amount of bandwidth currently being utilized by to the one or more other client devices; and
transmit the retrieved broadcast video data stream at a transmission rate that exceeds a real-time transmission rate of the broadcast video data using the transient excess bandwidth to fill the video decoder buffer with the retrieved broadcast video data stream, the transmitted retrieved broadcast video data stream being offset in time behind a current broadcast time of the requested digital channel, the offset in time comprising a difference between a time that the request is received and a broadcast time of the retrieved intra frame of broadcast video data, the broadcast video data stream being retrievable and transmittable over a duration of time that is less than a period of time used to access, retrieve, and transmit the intra frame of broadcast video data.

8. The system as recited in claim 7, wherein the retrieved broadcast video data stream is of a size that is sufficient to fill a decoding buffer at a client device.

9. The system as recited in claim 7, wherein the video data extractor and the video data distributor comprise software elements of a data center.

10. The system as recited in claim 7, wherein the storage device comprises a disk-based storage array.

11. The system as recited in claim 7, wherein the video data extractor and the video data distributor comprise a combination of one or more of hardware, software, and firmware of a server system.

12. A system for accelerating channel changing in a video broadcast environment, the system comprising:
a video data extractor configured to:
retrieve an intra frame of broadcast video data that is prior to a current broadcast time for a requested digital channel responsive to receiving a channel change request from a client device; and
retrieve a plurality of non-intra frames of broadcast video data following the retrieved intra frame; and a video data distributor configured to:
transmit the retrieved intra frame of broadcast video corresponding to the requested digital channel to the client device;
reallocate transient excess bandwidth from one or more other client devices to the client device responsive to receiving the channel change request from the client device, the transient excess bandwidth comprising at least a portion of a difference between an amount of bandwidth allocated to the one or more other client devices and an amount of bandwidth currently being utilized by the one or more other client devices; and transmit the retrieved plurality of non-intra frames at a transmission rate that exceeds a real-time transmission rate of the broadcast video data using the transient excess bandwidth, the plurality of non-intra frames being retrieved and transmitted over a duration of time that is less than a duration of time used to retrieve and transmit the intra frame of broadcast video data.

13. The system as recited in claim 12, wherein the system comprises a headend of at least one of a cable network and or a satellite network.

14. An arrangement for accelerating channel changing, the arrangement comprising:

distribution means for distributing an intra frame and a digital video stream of broadcast video data corresponding to a requested digital channel to a client device, the distribution means configured to:

reallocate transient excess bandwidth from one or more other client devices to the client device responsive to receiving a channel change request, the transient excess bandwidth comprising at least a portion of a difference between an amount of bandwidth allocated to the one or more other client devices and an amount of bandwidth utilized by the one or more other client devices; and distribute the digital video stream of the broadcast video data to the client device at a transmission rate that exceeds a real-time transmission rate of the broadcast video data using the transient excess bandwidth to fill the video decoder buffer with the digital video stream of the broadcast video data, the digital video stream of the broadcast video data being distributable over a duration of time that is less than a duration of time used to distribute the intra frame to the client device.

15. The arrangement as recited in claim 14, further comprising handling means configured to:

handle the channel change request, the channel change request having a requested digital channel; and receive the channel change request from the client device.

16. The arrangement as recited in claim 14, wherein the channel change request comprises a digital packet transmitted from the client device.

17. The arrangement as recited in claim 14, wherein the digital video stream of the broadcast video data comprises at least one predicted frame.

18. A system for accelerating channel changing in a video broadcast environment, the system comprising:

one or more memories, the one or more memories including broadcast video data and electronically-executable instructions; and one or more processors capable of executing the electronically-executable instructions to perform actions comprising:

receiving a request at a server for a new digital channel from a client device;

accessing the broadcast video data for the new digital channel;

seeking backward in time along the broadcast video data for the new digital channel until an intra frame is located, the seeking backward in time along the broadcast video data including selecting a most-recently-received intra frame when a condition is met, and selecting another intra frame received prior to the most-recently-received intra frame when the condition is not met, the condition being:

a plurality of non-intra frames of broadcast video following the most-recently-received intra frame and stored by the one or more memories are, together with the most-recently-received intra frame, sufficient to fill a video decoder buffer of the client device at least enough for a video decoder to commence decoding, the sufficiency of the plurality of non-intra frames and the most-recently-received intra frame being determined from buffer size data provided by the client device to the server;

retrieving the intra frame for the new digital channel from the broadcast video data;

retrieving a stream of broadcast video data that starts after the intra frame and extends along the broadcast video data for the new digital channel;

transmitting the intra frame for the new digital channel to the client device;

reallocating transient excess bandwidth from one or more other client devices to the client device responsive to receiving the request for the new digital channel, the transient excess bandwidth comprising a difference between an amount of bandwidth allocated to the one or more other client devices and an amount of bandwidth utilized by the one or more other client devices; and transmitting the stream of broadcast video data for the new digital channel to the client device at a transmission rate that exceeds a real-time transmission rate of the broadcast video data using the transient excess bandwidth to fill the video decoder buffer with the stream of broadcast video data, the transmitted steam of broadcast video data for the new digital channel being offset in time behind a current broadcast time of the new digital channel, the offset in time comprising a difference between a time that the request is received and a broadcast time of the intra frame of the broadcast video data, the stream of broadcast video data being retrieved and transmitted over a duration of time that is less than a duration of time used for the seeking, retrieving, and transmitting of the intra frame.

19. The system as recited in claim 18, wherein the one or more memories comprise a first memory and a second memory, the first memory storing the broadcast video data and the second memory storing the electronically-executable instructions.

20. The system as recited in claim 19, wherein the first memory comprises mass memory, and the second memory comprises random access memory (RAM).

21. The system as recited in claim 18, wherein the one or more processors comprise at least part of a server computer.

22. The system as recited in claim 18, wherein the system comprises a data center at a headend of a television-based entertainment network.

23. The system as recited in claim 18, further comprising:

one or more network interfaces, the one or more network interfaces capable of interfacing with at least one network and capable of being controlled by the one or more processors.

24. The system as recited in claim 18, wherein the one or more processors are configured to execute the electronically-executable instructions to perform a further action comprising:

establishing a point to point session with the client device across a two way unicast network.

25. The system as recited in claim 18, wherein retrieving the stream of broadcast video data comprises:
retrieving the stream of broadcast video data that starts after the intra frame and extends along the broadcast video data for the new digital channel for a period of time that is sufficient to fill a decoding buffer of the client device.

26. The system as recited in claim 18, wherein the one or more processors are configured to execute the electronically-executable instructions to perform further actions comprising:
receiving current broadcast video data from a broadcast center; and
storing the current broadcast video data at the one or more memories.

27. One or more computer storage media having computer-executable instructions stored thereon that, when executed by a processor, direct a server to:
retrieve an intra frame of broadcast video data from stored broadcast video data responsive to receiving a channel change request for a requested digital channel from a client device, the intra frame of broadcast video data comprising a most-recently-received intra frame in a portion of the stored broadcast video data that corresponds to the requested channel;
retrieve a digital video stream of broadcast video data following the retrieved intra frame from the stored broadcast video data for the requested digital channel;
reallocate transient excess bandwidth from one or more client devices to a client device responsive to receiving the channel change request for the requested digital channel from the client device, the transient excess bandwidth comprising at least a portion of a difference between an amount of bandwidth allocated to the one or more client devices and an amount of bandwidth utilized by the one or more client devices; and
send the digital video stream associated with the requested digital channel to the client device at a transmission rate that exceeds a real-time transmission rate of the broadcast video data using the transient excess bandwidth to fill the video decoder buffer with the digital video stream for the requested digital channel, the sent digital video stream for the requested digital channel being offset in time behind a current broadcast time of the requested digital channel, the offset in time comprising a difference between a time that the request is received and a broadcast time of the intra frame of the broadcast video data, the digital video stream being retrievable and sendable over a duration of time that is less than a duration of time used to retrieve and transmit the intra frame of the broadcast video data.

28. The one or more computer storage media as recited in claim 27, further comprising computer-executable instructions that, when executed by the processor, direct the server to: receive a packet, which is related to the channel change request, that includes the requested digital channel from the client device.

29. The one or more computer storage media as recited in claim 27, further comprising computer-executable instructions that, when executed by the processor, direct the server to:
retrieve the digital video stream for the requested digital channel such that the digital video stream is of a sufficient length so as to fill a decoding buffer of the client device.

30. A method comprising:
receiving, at a client device, a channel change input from a user, the channel change input ordering a change to a requested digital channel;
receiving an intra frame of broadcast video data associated with the requested digital channel; and
receiving, at the client device, a broadcast video data stream that follows the intra frame of broadcast video data at a transmission rate that exceeds a real-time transmission rate of the broadcast video data using transient excess bandwidth, the transient excess bandwidth comprising at least a portion of a difference between an amount of bandwidth allocated to one or more other client devices and an amount of bandwidth currently being utilized by the one or more other client devices, the received broadcast video data stream that follows the intra frame of broadcast video being offset in time behind a current broadcast time of the requested digital channel, the offset in time comprising a difference between a time that the request is received and a broadcast time of the intra frame of the broadcast video data, the broadcast video data stream that follows the intra frame of the broadcast video data being received over a duration of time that is less than a duration of time that elapses between the receiving of the channel change input from the user and the receiving of the intra frame of the broadcast video data.

31. The method as recited in claim 30, further comprising:
causing, at the client device, the intra frame of broadcast video data and the broadcast video data stream that follows the intra frame of broadcast video data to be displayed on a screen associated with the client device.

32. The method as recited in claim 30, wherein the client device comprises a set-top box.

33. One or more computer storage media having computer-executable instructions stored thereon that, when executed by a processor, direct one or more electronic devices to perform the method as recited in claim 30.

34. A method for accelerating channel changing in a video broadcast environment, the method comprising:
receiving at a server a channel change request from a client device, the channel change request indicating a requested new digital channel;
preparing a broadcast video data stream of the requested new digital channel that is offset in time behind a current broadcast time for broadcast video data of the requested new digital channel, the broadcast video data stream being prepared by at least determining whether a condition is met, and retrieving a most-recently-received complete frame when the condition is met or retrieving another complete frame received prior to the most-recently-received complete frame when the condition is not met, the condition including:
a plurality of incomplete frames of broadcast video following the most-recently-received complete frame are, together with the most-recently-received complete frame, sufficient to fill a video decoder buffer of the client device at least enough for a video decoder to commence decoding, the sufficiency of the plurality of incomplete frames and the most-recently-received complete frame being determined from buffer size data provided by the client device to the server;
reallocating transient excess bandwidth from one or more other client devices to the client device responsive to receiving the channel change request, the transient excess bandwidth comprising at least a portion of a difference between an amount of bandwidth allocated to the one or more other client devices and an amount of bandwidth utilized by the one or more other client devices; and streaming the broadcast video data stream of the requested new digital channel that is offset in time to the client device, the broadcast video data stream being streamed at a transmission rate that exceeds a real-time transmission rate of the broadcast video data using the transient excess bandwidth to fill the video decoder buffer with the broadcast video data stream, the broadcast video data stream of the requested new digital channel being offset in time behind the current broadcast time of the requested new digital channel, the offset in time comprising a difference between a time that the request is received and a broadcast time of the most-recently-received complete frame of the broadcast video data, the broadcast video data stream being streamed over a duration of time that is less than a duration of time used for the retrieving of the most-recently-received complete frame of the broadcast video data.

35. The method as recited in claim 34, wherein the offset in time is due to a difference between the current broadcast time and a time of a most recent intra frame for the broadcast video data of the requested new digital channel.

36. The method as recited in claim 34, wherein preparing the broadcast video data stream comprises:
accessing a storage device that includes stored broadcast video data of the requested new digital channel, the stored broadcast video data of the requested new digital channel including a plurality of intra frames received from a broadcast center.

37. One or more computer storage media having computer-executable instructions stored thereon that, when executed by a processor, direct one or more electronic devices to perform the method as recited in claim 34.

38. A headend capable of accelerating channel changing in a video broadcast environment, the headend comprising:
one or more memories, including electronically-executable instructions and stored broadcast video data, the stored broadcast video data including current broadcast video data and non-current broadcast video data; and
one or more processors configured to execute the electronically-executable instructions to perform a method, the method comprising:
receiving at the headend a request for a new digital channel from a client device;
accessing the stored broadcast video data that corresponds to the new digital channel;
retrieving a portion of non-current broadcast video data that corresponds to the new digital channel from the stored broadcast video data, the portion being retrieved by at least determining whether a condition is met, and retrieving a most-recently-received complete frame when the condition is met, or retrieving another complete frame received prior to the most-recently-received complete frame when the condition is not met, the condition including:
a plurality of incomplete frames of broadcast video following the most-recently-received complete frame are, together with the most-recently-received complete frame, sufficient to fill a video decoder buffer of the client device at least enough for a video decoder to commence decoding, the sufficiency of the plurality of incomplete frames and the most-recently-received complete frame being determined from buffer size data provided by the client device to the headend;

reallocating transient excess bandwidth from one or more other client devices to the client device responsive to receiving the request for the new digital channel, the transient excess bandwidth comprising at least a portion of a difference between an amount of bandwidth allocated to the one or more other client devices and an amount of bandwidth utilized by the one or more other client devices; and transmitting at least part of the portion of the non-current broadcast video data that corresponds to the new digital channel to the client device responsive to the request and at a transmission rate that exceeds a real-time transmission rate of the stored broadcast video using the transient excess bandwidth to fill the video decoder buffer with the at least part of the portion of the non-current broadcast video data that corresponds to the new digital channel, the at least part of the portion of the non-current broadcast video data that corresponds to the new digital channel being offset in time behind a current broadcast time of the requested new digital channel, the offset in time comprising a difference between a time that the request is received and the current broadcast time, the video decoder buffer being filled over a duration of time that is less than a duration of time used for the retrieving of the most-recently-received complete frame.

39. The headend as recited in claim 38, wherein the at least part of the portion of the non-current broadcast video data comprises at least one intra frame and a plurality of non-intra frames; and
wherein the at least part of the portion of the non-current broadcast video data comprises the plurality of non-intra frames.

40. A method for a headend of a television-based entertainment network, the method comprising:
continuously receiving a stream of broadcast video data for a particular digital channel;
storing the stream of broadcast video data for the particular digital channel in a storage device, the stream of broadcast video data including a plurality of intra frames of broadcast video data and a plurality of non-intra frames of broadcast video data, the plurality of intra frames of broadcast video data including a most-recently-received intra frame of broadcast video data, the plurality of non-intra frames of broadcast video data including a non-intra frame of broadcast video data that corresponds to a current broadcast time;
receiving at the headend a channel change request from a client device, the channel change request indicating a request to change channels to the particular digital channel;
retrieving an intra frame of broadcast video data and one or more non-intra frames of the plurality of non-intra frames of broadcast video data from the storage device, the one or more non-intra frames of broadcast video data being temporally located after the intra frame of broadcast video data and before the non-intra frame of broadcast video data that corresponds to the current broadcast time, the intra frame being retrieved by at least determining whether a condition is met, and retrieving the most-recently-received intra frame when the condition is met, or retrieving a second intra frame received prior to the most-recently-received intra frame when the condition is not met, the condition including:
a plurality of received non-intra frames of broadcast video following the most-recently-received complete frame are, together with the most-recently-received complete frame, sufficient to fill a video decoder buffer of the client device at least enough for a video decoder to commence decoding, the sufficiency of the plurality of non-intra frames and the most-recently-received intra frame being determined from buffer size data provided by the client device to the headend;

reallocating transient excess bandwidth from one or more other client devices to the client device responsive to receiving the channel change request, the transient excess bandwidth comprising at least a portion of a difference between an amount of bandwidth allocated to the one or more other client devices and an amount of bandwidth utilized by the one or more other client devices; and sending the most-recently-received intra frame of broadcast video data and the one or more non-intra frames of broadcast video data to the client device responsive to receiving the channel change request, the one or more non-intra frames of broadcast video data being sent to the client device at a transmission rate that exceeds a real-time transmission rate of the broadcast video data using the transient excess bandwidth to fill the video decoder buffer with the one or more non-intra frames of broadcast video data, the sent one or more non-intra frames of broadcast video data being offset in time behind a current broadcast time of the particular digital channel, the offset in time comprising a difference between a time that the request is received and a broadcast time of the most-recently-received intra frame of the broadcast video data, the one or more non-intra frames of broadcast video data being retrieved and sent over a duration of time that is less than a period of time used for the retrieving and sending of the intra frame of broadcast video data.

41. The method for a headend as recited in claim 40, the method comprising:

sending the non-intra frame of broadcast video data that corresponds to the current broadcast time and any additional non-intra frames of broadcast video data that are between a last non-intra frame of broadcast video data of the one or more non-intra frames of broadcast video data and the non-intra frame of broadcast video data that corresponds to the current broadcast time.

42. One or more computer-storage media having computer-executable instructions stored thereon that, when executed by a processor, direct a headend to perform the method as recited in claim 40.

43. A headend that is capable of accelerating channel changing in a video broadcast environment, the headend configured to perform actions comprising:

receiving a channel change request that corresponds to a first time and is directed to a requested digital channel;

accessing broadcast video data for the requested digital channel;

retrieving an intra frame of broadcast video data that corresponds to a second time from the broadcast video data for the requested digital channel, the second time being earlier than the first time;

retrieving broadcast video data frames that follow the intra frame of broadcast video data from the broadcast video data for the requested digital channel, the intra frame being retrieved by at least determining whether a condition is met, and retrieving a most-recently-received intra frame when the condition is met, or retrieving a second intra frame received prior to the most-recently-received intra frame when the condition is not met, the condition including:

a plurality of non-intra frames of broadcast video following the most-recently-received intra frame are, together with the most-recently-received intra frame, sufficient to fill a video decoder buffer of a client device at least enough for a video decoder to commence decoding, the sufficiency of the plurality of non-intra frames and the most-recently-received intra frame being determined from buffer size data provided by the client device to the headend;

sending the intra frame of broadcast video data from the headend;

reallocating transient excess bandwidth from one or more other client devices to the client device responsive to receiving the channel change request, the transient excess bandwidth comprising at least a portion of a difference between an amount of bandwidth allocated to the one or more other client devices and an amount of bandwidth utilized by the one or more other client devices; and sending the broadcast video data frames that follow the intra frame of broadcast video data from the headend at a transmission rate that exceeds a real-time transmission rate of the broadcast video data using the transient excess bandwidth to fill the video decoder buffer with the broadcast video data frames that follow the intra frame of broadcast video data, the sent broadcast video data frames that follow the intra frame of broadcast video data being offset in time behind a current broadcast time of the requested digital channel, the offset in time comprising a difference between a time that the request is received and a broadcast time of the intra frame of the broadcast video data, the broadcast video frames that follow the intra frame of broadcast video data being retrieved and sent over a duration of time that is less than a duration of time used for the retrieving and sending of the intra frame of broadcast video data.

44. The headend as recited in claim 43, wherein the first time is associated with at least one of a transmission time of the channel change request and or a reception time of the channel change request.

45. The headend as recited in claim 43, wherein the intra frame of broadcast video data comprises an intra frame of broadcast video data in accordance with a Moving Pictures Expert Group (MPEG)-compliant scheme.

* * * * *